(12) United States Patent
Ohara et al.

(10) Patent No.: US 9,608,261 B2
(45) Date of Patent: Mar. 28, 2017

(54) POSITIVE ELECTRODE FOR NON-AQUEOUS ELECTROLYTE SECONDARY BATTERY AND NON-AQUEOUS ELECTROLYTE SECONDARY BATTERY USING THE SAME

(71) Applicant: NISSAN MOTOR CO., LTD., Yokohama-shi, Kanagawa (JP)

(72) Inventors: Kenji Ohara, Yokohama (JP); Yoshiaki Nitta, Yokohama (JP); Satoru Ichikawa, Yokohama (JP); Gentaro Kano, Yokohama (JP); Manabu Nishijima, Yokohama (JP); Osamu Shimamura, Yokohama (JP); Fumihiro Kawamura, Yokohama (JP); Kousuke Hagiyama, Yokohama (JP); Shigeo Ibuka, Yokohama (JP); Manabu Kaseda, Yokohama (JP); Masanori Suenaga, Yokohama (JP); Tamaki Hirai, Yokohama (JP); Masahiro Takaya, Yokohama (JP); Kuniharu Nomoto, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/776,010

(22) PCT Filed: Mar. 13, 2014

(86) PCT No.: PCT/JP2014/056798
§ 371 (c)(1),
(2) Date: Sep. 14, 2015

(87) PCT Pub. No.: WO2014/142283
PCT Pub. Date: Sep. 18, 2014

(65) Prior Publication Data
US 2016/0028073 A1    Jan. 28, 2016

(30) Foreign Application Priority Data

Mar. 15, 2013    (JP) .................................. 2013-054106

(51) Int. Cl.
*H01M 2/02*    (2006.01)
*H01M 4/36*    (2006.01)
(Continued)

(52) U.S. Cl.
CPC ......... *H01M 4/364* (2013.01); *H01M 2/0217* (2013.01); *H01M 2/0285* (2013.01);
(Continued)

(58) Field of Classification Search
CPC ............. H01M 2/0207; H01M 2/0217; H01M 2/0285; H01M 2/16; H01M 4/131;
(Continued)

(56) References Cited

U.S. PATENT DOCUMENTS 6,682,850 B1    1/2004   Numata et al.
6,818,351 B2   11/2004   Sunagawa et al.
(Continued)

FOREIGN PATENT DOCUMENTS

EP    1 174 937 A1    1/2002
EP    2 733 776 A1    5/2014
(Continued)

OTHER PUBLICATIONS

U.S. Appl. No. 14/776,270, filed Sep. 14, 2015, Nissan Motor Co., Ltd.
(Continued)

*Primary Examiner* — Brittany Raymond
(74) *Attorney, Agent, or Firm* — Foley & Lardner LLP

(57) ABSTRACT

[Object] Provided is a means for improving cycle characteristics by suppressing electrode deterioration resulting
(Continued)

from non-uniformity of voltage across an electrode plane in a high-capacity and large-area non-aqueous electrolyte secondary battery that includes lithium nickel-based composite oxide as a positive electrode active substance.

[Solving Means] Disclosed is a positive electrode for a non-aqueous electrolyte secondary battery used in a non-aqueous electrolyte secondary battery in which the ratio value of battery area (projected area of the battery including the battery outer casing body) to rated capacity is 5 cm$^2$/Ah or more and the rated capacity is 3 Ah or more, the positive electrode comprising a positive electrode current collector and a positive electrode active substance layer that is formed on a surface of the positive electrode current collector and has a positive electrode active substance containing a lithium nickel-based composite oxide and a spinel type lithium manganese composite oxide, in which, when the average secondary particle diameter (D50) of the lithium nickel-based composite oxide is D50(A) [μm], the content ratio of the lithium nickel-based composite oxide in the positive electrode active substance layer is A [% by mass], the average secondary particle diameter (D50) of the spinel type lithium manganese composite oxide is D50(B) [μm], and the content ratio of the spinel type lithium manganese composite oxide in the positive electrode active substance layer is B [% by mass], the positive electrode satisfies the following Mathematical Formula 1 and Mathematical Formula 2:

[Math. 1]

$$0.5 \leq D50(A)/D50(B) \leq 2.0 \quad \text{Mathematical Formula 1:}$$

$$B/(A+B) \geq 0.2 \quad \text{Mathematical Formula 2:}$$

11 Claims, 3 Drawing Sheets

(51) Int. Cl.
  *H01M 4/505* (2010.01)
  *H01M 4/525* (2010.01)
  *H01M 10/0525* (2010.01)
  *H01M 4/131* (2010.01)
  *H01M 10/0585* (2010.01)
  *H01M 2/16* (2006.01)
  *H01M 4/02* (2006.01)

(52) U.S. Cl.
  CPC ........... *H01M 4/131* (2013.01); *H01M 4/505* (2013.01); *H01M 4/525* (2013.01); *H01M 10/0525* (2013.01); *H01M 10/0585* (2013.01); *H01M 2/16* (2013.01); *H01M 2004/021* (2013.01); *H01M 2004/028* (2013.01); *H01M 2220/20* (2013.01); *Y02E 60/122* (2013.01)

(58) Field of Classification Search
  CPC ...... H01M 4/364; H01M 4/505; H01M 4/525; H01M 10/0525; H01M 10/0585; H01M 2004/021; H01M 2004/028; H01M 2220/20; Y02E 60/122
  See application file for complete search history.

(56) References Cited

U.S. PATENT DOCUMENTS

| | | | |
|---|---|---|---|
| 8,852,805 | B2 | 10/2014 | Saka et al. |
| 2002/0164528 | A1 | 11/2002 | Sunagawa et al. |
| 2004/0142234 | A1* | 7/2004 | Nakanishi ............. H01M 4/364 429/122 |
| 2010/0112447 | A1 | 5/2010 | Yamamoto et al. |
| 2011/0111280 | A1 | 5/2011 | Tamakoshi et al. |
| 2012/0258351 | A1 | 10/2012 | Saka et al. |
| 2013/0330612 | A1 | 12/2013 | Choi et al. |

FOREIGN PATENT DOCUMENTS

| | | | |
|---|---|---|---|
| EP | 2 991 151 A1 | | 3/2016 |
| EP | 2 991 152 A1 | | 3/2016 |
| JP | 11-054120 A | | 2/1999 |
| JP | 2000-077071 A | | 3/2000 |
| JP | 2002-100358 A | | 4/2002 |
| JP | 2002-164049 A | | 6/2002 |
| JP | 2002-251996 A | | 9/2002 |
| JP | 2002-270245 | * | 9/2002 |
| JP | 2002-270245 A | | 9/2002 |
| JP | 2003-346798 A | | 12/2003 |
| JP | 2005-285633 A | | 10/2005 |
| JP | 2006-054189 A | | 2/2006 |
| JP | 2006-216305 | * | 8/2006 |
| JP | 2006-216305 A | | 8/2006 |
| JP | 2006-278322 A | | 10/2006 |
| JP | 2007-207626 | * | 8/2007 |
| JP | 2007-207626 A | | 8/2007 |
| JP | 2008-181830 A | | 8/2008 |
| JP | 2008-282667 A | | 11/2008 |
| JP | 2009-032682 A | | 2/2009 |
| JP | 2009-043703 A | | 2/2009 |
| JP | 2010-015904 A | | 1/2010 |
| JP | 2011-105588 A | | 6/2011 |
| JP | 2011-129410 A | | 6/2011 |
| WO | WO-2010/049977 A1 | | 5/2010 |
| WO | Wo-2012/144785 A2 | | 10/2012 |
| WO | WO-2014/175354 A1 | | 10/2014 |
| WO | WO-2014/175355 A1 | | 10/2014 |

OTHER PUBLICATIONS

European Extended Search Report, Mar. 11, 2016, 9 pages.
USPTO Office Action, U.S. Appl. No. 14/776,270, filed Jun. 30, 2016, 13 pages.
USPTO Office Action, U.S. Appl. No. 14/776,270, filed Oct. 17, 2016, 9 pages.

* cited by examiner

POSITIVE ELECTRODE FOR NON-AQUEOUS ELECTROLYTE SECONDARY BATTERY AND NON-AQUEOUS ELECTROLYTE SECONDARY BATTERY USING THE SAME

TECHNICAL FIELD

The present invention relates to a positive electrode for a non-aqueous electrolyte secondary battery and a non-aqueous electrolyte secondary battery using the positive electrode.

BACKGROUND ART

Currently, a non-aqueous electrolyte secondary battery including a lithium ion secondary battery, which is used for a mobile device such as a mobile phone, is available as a commercial product. The non-aqueous electrolyte secondary battery generally has a constitution that a positive electrode having a positive electrode active substance or the like coated on a current collector and a negative electrode having a negative electrode active substance or the like coated on a current collector are connected to each other via an electrolyte layer in which a non-aqueous electrolyte solution or a non-aqueous electrolyte gel is maintained within a separator. According to absorption and desorption of ions such as lithium ions on an electrode active substance, charging and discharging reactions of a battery occur.

In recent years, it is desired to reduce the amount of carbon dioxide in order to cope with the global warming. As such, a non-aqueous electrolyte secondary battery having small environmental burden has been used not only for a mobile device or the like but also for a power source device of an electric vehicle such as a hybrid vehicle (HEV), an electric vehicle (EV), and a fuel cell vehicle.

As the non-aqueous electrolyte secondary battery for application to an electric vehicle, it is required to have high output and high capacity. As a positive electrode active substance used for the positive electrode of a non-aqueous electrolyte secondary battery for an electric vehicle, a lithium cobalt-based composite oxide, which is a layered composite oxide, has been already widely used since it can provide high voltage at the level of 4 V and has high energy density. However, due to resource scarcity, cobalt as a raw material is expensive, and considering the possibility of having dramatic demand in future, it is not stable in terms of supply of a raw material. There is also a possibility of having an increase in the raw material cost of cobalt. Accordingly, a composite oxide having less cobalt content ratio is desired.

A spinel type lithium manganese composite oxide ($LiMn_2O_4$) has a spinel structure and it functions as a positive electrode material of 4 V grade according to the composition with $\lambda$-$MnO_2$. By having a three dimensional host structure which is different from a layered structure of $LiCoO_2$ or the like, most of the theoretical capacity of the spinel type lithium manganese composite oxide is usable and it is expected to have excellent cycle characteristics.

However, with a lithium ion secondary battery in which the spinel type lithium manganese composite oxide is used as a positive electrode material, it is actually impossible to avoid capacity deterioration which exhibits a gradual decrease in capacity according to repeated charge and discharge. As such, there has been a big problem for putting it to practical use.

As a technique for solving the problem of capacity deterioration of a spinel type lithium manganese composite oxide, in JP 2000-77071 A, for example, a technique of further using, as a positive electrode material, a lithium nickel-based composite oxide ($LiNiO_2$, $Li_2NiO_2$, $LiNi_2O_4$, $Li_2Ni_2O_4$, $LiNi_{1-x}M_xO_2$, or the like) with a predetermined specific surface area in addition to a spinel type lithium manganese composite oxide is disclosed. According to JP 2000-77071 A, it is described that, by having such constitution, dissolution of Mn from the spinel type lithium manganese composite oxide or a change in Li concentration in an electrolyte solution is suppressed, and as a result, a non-aqueous electrolyte secondary battery with highly improved charge and discharge cycle characteristics (in particular, charge and discharge service life at high temperature) can be provided.

SUMMARY OF INVENTION

According to the studies by the inventors of the present invention, it was found that, even with the technique described in JP 2000-77071 A, if a battery is produced to have high capacity and large area, sufficient charge and discharge cycle characteristics are not achieved. It was also found that such a decrease in charge and discharge cycle characteristics is caused by deterioration of an electrode in local over-charge mode, resulting from easy occurrence of non-uniformity of voltage across an electrode plane by having a battery with high capacity and large area, which is caused by inclusion of a lithium nickel-based composite oxide as a positive electrode active substance.

Accordingly, the present invention is intended to provide a means for realizing improvements in cycle characteristics by suppressing electrode deterioration resulting from non-uniformity of voltage across an electrode plane in a high-capacity and large-area non-aqueous electrolyte secondary battery that includes a lithium nickel-based composite oxide as a positive electrode active substance.

The inventors of the present invention conducted intensive studies. As a result, it was found that the above problems can be solved when the spinel type lithium manganese composite oxide is used in combination with the lithium nickel-based composite oxide as a positive electrode active substance and an average secondary particle diameter and the content ratio thereof are controlled to a value within a predetermined range. The present invention is completed accordingly.

According to one embodiment of the present invention, a positive electrode for a non-aqueous electrolyte secondary battery used in a non-aqueous electrolyte secondary battery in which the ratio value of battery area (projected area of the battery including the battery outer casing body) to rated capacity is 5 $cm^2$/Ah or more and the rated capacity is 3 Ah or more is provided. The positive electrode has a positive electrode current collector and a positive electrode active substance layer that is formed on a surface of the positive electrode current collector and has a positive electrode active substance containing the lithium nickel-based composite oxide and the spinel type lithium manganese composite oxide. Furthermore, it is characterized in that the positive electrode satisfies Mathematical Formula 1 and Mathematical Formula 2 that are given below:

[Math. 1]

$$0.5 \leq D50(A)/D50(B) \leq 2.0 \quad \text{MathematicalFormula1:}$$

$$B/(A+B) \geq 0.2 \quad \text{MathematicalFormula2:}$$

when the average secondary particle diameter (D50) of the lithium nickel-based composite oxide is D50(A) [μm], the content ratio of the lithium nickel-based composite oxide in the positive electrode active substance layer is A [% by mass], the average secondary particle diameter (D50) of the spinel type lithium manganese composite oxide is D50(B) [μm], and the content ratio of the spinel type lithium manganese composite oxide in the positive electrode active substance layer is B [% by mass].

DESCRIPTION OF EMBODIMENT

Figure 1:
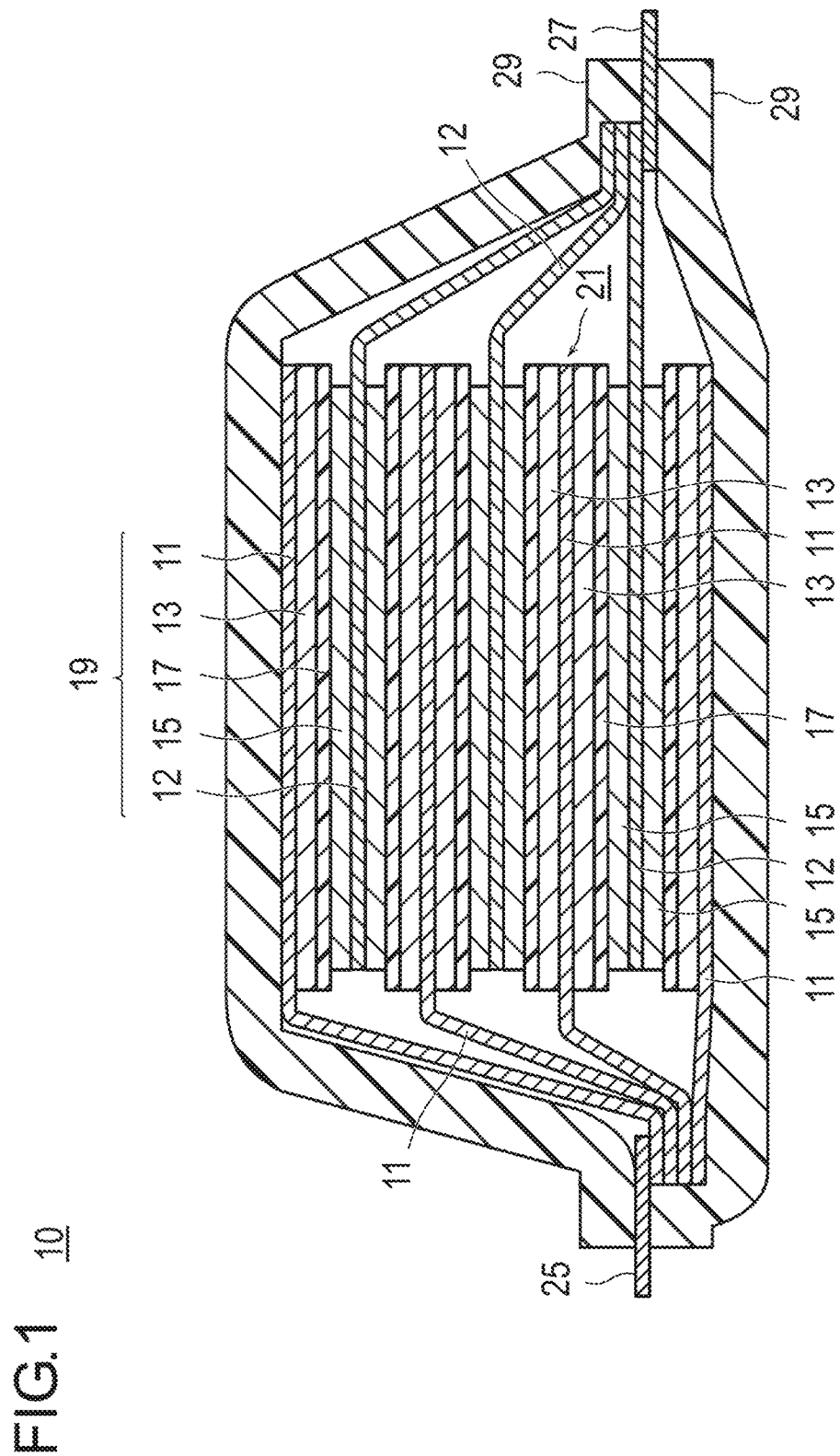
FIG. 1 is a cross-sectional view schematically illustrating a basic constitution of a non-aqueous electrolyte lithium ion secondary battery which is not a bipolar type of flat type (stack type) as one embodiment of the non-aqueous electrolyte lithium ion secondary battery.

According to one embodiment of the present invention, provided is a positive electrode for a non-aqueous electrolyte secondary battery for use in a non-aqueous electrolyte secondary battery in which the ratio of battery area (projected area of the battery including the battery outer casing body) to rated capacity is 5 cm$^2$/Ah or more and the rated capacity is 3 Ah or more, which has a positive electrode current collector and a positive electrode active substance layer that is formed on a surface of the positive electrode current collector and has a positive electrode active substance containing a lithium nickel-based composite oxide and a spinel type lithium manganese composite oxide, and the positive electrode for a non-aqueous electrolyte secondary battery satisfies Mathematical Formula 1 and Mathematical Formula 2 that are given below when the average secondary particle diameter (D50) of the lithium nickel-based composite oxide is D50(A) [μm], the content ratio of the lithium nickel-based composite oxide in the positive electrode active substance layer is A [% by mass], the average secondary particle diameter (D50) of the spinel type lithium manganese composite oxide is D50(B) [μm], and the content ratio of the spinel type lithium manganese composite oxide in the positive electrode active substance layer is B [% by mass]:

[Math. 2]

$$0.5 \leq D50(A)/D50(B) \leq 2.0 \qquad \text{Mathematical Formula 1:}$$

$$B/(A+B) \geq 0.2 \qquad \text{Mathematical Formula 2:}$$

According to the positive electrode for a non-aqueous electrolyte secondary battery of the present invention, the spinel type lithium manganese composite oxide acts as an over-voltage promoter so that it can increase the resistance around the spinel type lithium manganese composite oxide at a voltage near the upper voltage use limit of a battery, and thus an occurrence of local over-charge mode in an electrode is suppressed. As a result, electrode deterioration resulting from non-uniformity of voltage across an electrode plane is prevented and it becomes possible to improve the cycle characteristics of a non-aqueous electrolyte secondary battery.

Next, descriptions are given for a non-aqueous electrolyte lithium ion secondary battery as a preferred embodiment of the non-aqueous electrolyte secondary battery to which the positive electrode of the present invention is applied, but it is not limited to the embodiments described below. Meanwhile, the same elements are given with the same symbols for the descriptions of the drawings, and overlapped descriptions are omitted. Further, note that dimensional ratios in the drawings are exaggerated for the sake of explanation, and are different from actual ratios in some cases.

FIG. 1 is a cross-sectional view schematically illustrating the basic constitution of a non-aqueous electrolyte lithium ion secondary battery which is not a bipolar type of flat type (stack type) (hereinbelow, it is also simply referred to as a "stack type battery"). As illustrated in FIG. 1, a stack type battery 10 according to this embodiment has a structure in which the power generating element 21 with a substantially rectangular shape, in which a charge and discharge reaction actually occurs, is sealed inside of a battery outer casing material 29 as an outer casing body. Herein, the power generating element 21 has a constitution in which a positive electrode, a separator 17, and a negative electrode are stacked. Meanwhile, the separator 17 has a non-aqueous electrolyte (for example, liquid electrolyte) therein. The positive electrode has a structure in which the positive electrode active substance layer 15 is disposed on both surfaces of the positive electrode current collector 12. The negative electrode has a structure in which the negative electrode active substance layer 13 is disposed on both surfaces of the negative electrode current collector 11. Specifically, one positive electrode active substance layer 15 and the neighboring negative electrode active substance layer 13 are disposed to face each other via the separator 17, and a negative electrode, an electrolyte layer and a positive electrode are stacked in this order. Accordingly, the neighboring positive electrode, electrolyte layer and negative electrode form one single battery layer 19. As such, it can also be said that, as plural single barrier layers 19 are stacked, the stack type battery 10 illustrated in FIG. 1 has a constitution in which electrically parallel connection is made among them.

Meanwhile, on the outermost layer positive electrode current collector which is present on both outermost layers of the power generating element 21, the negative electrode active substance layer 13 is disposed only on a single surface. However, an active substance layer may be formed on both surfaces. Namely, not only a current collector exclusive for an outermost layer in which an active substance layer is formed only on a single surface can be prepared but also a current collector having an active substance layer on both surfaces can be directly used as a current collector of an outermost layer. Furthermore, by reversing the arrangement of the positive electrode and negative electrode of FIG. 1, it is also possible that the outermost layer positive electrode current collector is disposed on both outermost layers of the power generating element 21 and a positive electrode active substance layer is disposed on a single surface or both surfaces of the outermost layer positive electrode current collector.

The positive electrode current collector 12 and negative electrode current collector 11 have a structure in which each of the positive electrode current collecting plate (tab) 27 and negative electrode current collecting plate (tab) 25, which conductively communicate with each electrode (positive electrode and negative electrode), is attached and inserted to a terminal of the battery outer casing material 29 so as to be led to the outside of the battery outer casing material 29. If necessary, each of the positive electrode current collecting plate 27 and negative electrode current collecting plate 25 can be attached, via a positive electrode lead and negative electrode lead (not illustrated), to the positive electrode current collector 11 and negative electrode current collector 12 of each electrode by ultrasonic welding or resistance welding.

Meanwhile, although a stack type battery is illustrated in FIG. 1 instead of a bipolar type of flat type (stack type), it can also be a bipolar type battery containing a bipolar type electrode which has a positive electrode active substance layer electrically bound to one surface of a current collector and a negative electrode active substance layer electrically bound to the opposite surface of a current collector. In that case, one current collector plays both roles of a positive electrode current collector and a negative electrode current collector.

Hereinbelow, each member is described in more detail.

[Positive Electrode]

The positive electrode has a positive electrode current collector and a positive electrode active substance layer that is formed on a surface of the positive electrode current collector.

(Positive Electrode Current Collector)

The material for constituting a positive electrode current collector is not particularly limited, but a metal is preferably used. Specific examples of the metal include aluminum, nickel, iron, stainless, titan, copper, and other alloys. In addition to them, a clad material of a nickel and aluminum, a clad material of copper and aluminum, or a plating material of a combination of those metals can be preferably used. It can also be a foil obtained by coating aluminum on a metal surface. Among them, from the viewpoint of electron conductivity or potential for operating a battery, aluminum, stainless, and copper are preferable.

The size of the current collector is determined based on use of a battery. When it is used for a large-size battery which requires high energy density, for example, a current collector with large area is used. Thickness of the current collector is not particularly limited, either. Thickness of the current collector is generally 1 to 100 μm or so.

(Positive Electrode Active Substance Layer)

The positive electrode active substance layer contains a positive electrode active substance. According to this embodiment, the positive electrode active substance essentially contains lithium nickel-based composite oxide and spinel type lithium manganese composite oxide. Meanwhile, the ratio of the total amount of lithium nickel-based composite oxide and spinel type lithium manganese composite oxide relative to the whole amount of 100% by weight of the positive electrode active substance contained in the positive electrode active substance layer is preferably 50% by weight or more, more preferably 70% by weight or more, even more preferably 85% by weight or more, still even more preferably 90% by weight or more, particularly preferably 95% by weight or more, and most preferably 100% by weight.

Lithium Nickel-Based Composite Oxide

The lithium nickel-based composite oxide is not specifically limited in terms of the composition as long as it is a composite oxide containing lithium and nickel. Representative examples of the composite oxide containing lithium and nickel include a lithium nickel composite oxide ($LiNiO_2$). However, a composite oxide in which part of the nickel atoms of the lithium nickel composite oxide is replaced with another metal atom is more preferable. As a preferable example, a lithium-nickel-manganese-cobalt composite oxide (hereinbelow, also simply referred to as "NMC composite oxide") has a layered crystal structure in which a lithium atom layer and a transition metal (Mn, Ni, and Co are arranged with regularity) atom layer are alternately stacked via an oxygen atom layer, one Li atom is included per atom of transition metal M and extractable Li amount is twice the amount of spinel type lithium manganese oxide, that is, as the supply power is two times higher, it can have high capacity. In addition, as having higher heat stability compared to $LiNiO_2$, it is particularly advantageous among the nickel-based composite oxides that are used as a positive electrode active substance.

As described herein, the NMC composite oxide includes a composite oxide in which part of transition metal elements are replaced with another metal element. In that case, examples of another element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

By having high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \le a \le 1.2$, $0 < b < 1$, $0 < c \le 0.5$, $0 < d \le 0.5$, $0 \le x \le 0.3$, and $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \le b \le 0.6$ in the General Formula (1). Meanwhile, composition of each element can be measured, for example, by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element are replaced by another metal element, and it is preferable that $0 < x \le 0.3$ is satisfied in the General Formula (1), in particular. It is believed that the crystal structure is stabilized by dissolving at least one selected from the group consisting of Ti, Zr, Nb, W, P, Al, Mg, V, Ca, Sr and Cr so that decrease in capacity of a battery can be prevented even after repeated charge and discharge, and thus, excellent cycle characteristics can be achieved.

With regard to the NMC composite oxide, the inventors of the present invention found that the influence of deformation and cracking of a composite oxide during charge and discharge described above becomes higher if the metal composition of nickel, manganese and cobalt is heterogeneous like $LiNi_{0.5}Mn_{0.3}Co_{0.2}O_2$. This is believed because, as the metal composition is heterogeneous, deformation is caused in stress applied to the inside of a particle during expansion and shrinkage so that cracks are more easily generated in the composite oxide. Thus, when comparison is made with, for example, a composite oxide having a rich Ni abundance ratio (for example, $LiNi_{0.8}Mn_{0.1}Co_{0.1}O_2$) or a composite oxide with a homogenous abundance ratio of Ni, Mn and Co (for example, $LiNi_{0.3}Mn_{0.3}Co_{0.3}O_2$), more significant decrease in long-term cycle characteristics is yielded. By having the structure according to this embodiment, it was found that the cycle characteristics are surprisingly improved even for a composite oxide having a heterogeneous metal composition like $LiNi_{0.5}Mn_{0.3}Co_{0.2}O_2$.

Thus, the positive electrode active substance with a composite oxide in which b, c, and d in the General Formula (1) satisfy $0.44 \leq b \leq 0.51$, $0.27 \leq c \leq 0.31$, and $0.19 \leq d \leq 0.26$ is preferable in that the effect of the present invention is obtained at significant level.

The lithium nickel-based composite oxide has a structure of secondary particles formed by aggregation of primary particles. In addition, the average particle diameter of the primary particles (average primary particle diameter) is preferably 0.9 µm or less, more preferably 0.20 to 0.6 µm and even more preferably 0.25 to 0.5 µm. In addition, the average particle diameter of the secondary particles (average secondary particle diameter, also referred to as "D50(A)" as described herein) is preferably 5 to 20 µm, and more preferably 5 to 15 µm. In addition, it is sufficient that the ratio value thereof (the average secondary particle diameter/the average primary particle diameter) is higher than 11. Preferably, it is 15 to 50, and more preferably 25 to 40. Meanwhile, the primary particles forming the lithium nickel-based composite oxide generally have a crystal structure of hexagonal crystal package with layered structure. The largeness of the diameter of crystallite is related to the largeness of the average primary particle diameter. As described herein "crystallite" indicates the largest group which can be determined as a monocrystal, and it can be measured by the method of refining structure parameters of a crystal from diffraction intensity that is obtained by powder X ray diffraction measurement or the like. The specific value of the crystallite diameter is, although not particularly limited, preferably 1 µm or less, more preferably 0.55 µm or less, and even more preferably 0.4 µm or less. By having such a structure, the displacement amount involved with shrinkage and expansion of an active substance can be further reduced and an occurrence of micronization (cracking) of the secondary particles accompanying repetition of charge and discharge is inhibited, which can further contribute to improvement of the cycle characteristics. Meanwhile, the lower limit of the crystallite diameter is, although not particularly limited, generally 0.02 µm or more. In the present specification, the values of the average primary particle diameter, the average secondary particle diameter (D50(A)) and the crystallite diameter of the lithium nickel-based composite oxide can be measured by known methods, and in particular, regarding the average secondary particle diameter and the crystallite diameter, the value measured by the method described below are used.

Namely, as for the measurement of the average secondary particle diameter (D50(A)), the value measured by laser diffraction method is used. Furthermore, the crystallite diameter was measured by Rietveld method by which crystallite diameter is calculated from diffraction peak intensity obtained by powder X ray diffraction measurement.

The tap density of the lithium nickel-based composite oxide is preferably 2.3 $g/cm^3$ or more, and more preferably 2.4 to 2.9 $g/cm^3$. By having such a structure, high density of the primary particles forming the secondary particles of the positive electrode active substance is sufficiently ensured, and thus the effect of improving the cycle characteristics can be maintained.

In addition, the BET specific surface area of the lithium nickel-based composite oxide is preferably 0.1 to 1.0 $m^2/g$, more preferably 0.3 to 1.0 $m^2/g$, and particularly preferably 0.3 to 0.7 $m^2/g$. As the specific surface area of the active substance is within this range, the reaction area of the active substance is ensured so that the internal resistance of a battery is lowered. As a result, an occurrence of polarization can be suppressed at minimum level at the time of an electrode reaction.

Furthermore, regarding the lithium nickel-based composite oxide, the diffraction peak of a (104) surface and the diffraction peak of a (003) surface which are obtained by powder X ray diffraction measurement, have a diffraction peak intensity ratio ((003)/(104)) of preferably 1.28 or more and more preferably 1.35 to 2.1. Furthermore, the diffraction peak integrated intensity ratio ((003)/(104)) is preferably 1.08 or more and more preferably 1.10 to 1.45. Those requirements are preferred due to the following reasons. Specifically, the lithium nickel-based composite oxide has a layered rock salt structure in which $Li^+$ layer and $Ni^{3+}$ layer are present between oxygen layers. However, as $Ni^{3+}$ is easily reduced to $Ni^{2+}$ and the ionic radius of $Ni^{2+}$ (0.83 A) is substantially equal to the ionic radius of $Li^+$ (0.90 A), it is easy for $Ni^{2+}$ to be incorporated into a $Li^+$ defect site which is generated during synthesis of the active substance. Once $Ni^{2+}$ is incorporated into the $Li^+$ site, an electrochemically unstable structure is formed locally, and also diffusion of $Li^+$ is inhibited. For such reasons, when an active substance with low crystallinity is used, there is a possibility that the battery charge and discharge capacity is lowered or durability is impaired. Thus, as an indicator of this crystallinity, the aforementioned requirements are employed. Herein, as a method for quantifying the crystallinity, the diffraction peak intensity ratio of a (003) surface to a (104) surface and the integrated intensity ratio of diffraction peak, based on crystal structure analysis using X ray diffraction as described above, were used. When these parameters satisfy the above requirements, there are fewer defects within a crystal so that a decrease in battery charge and discharge capacity or impairment of durability can be suppressed. Meanwhile, the parameters of crystallinity can be controlled based on a raw material, a composition, conditions for calcination or the like.

The lithium nickel-based composite oxide such as the NMC composite oxide can be produced by selecting various known methods such as a co-precipitation method and a spray drying method. From the viewpoint of having easy production of the composite oxide according to this embodiment, a co-precipitation method is preferably used. Specifically, with regard to a method for synthesizing the NMC composite oxide, production can be made by, for example, a method described in JP 2011-105588 A in which a nickel-cobalt-manganese composite oxide is produced by the co-precipitation method and the nickel-cobalt-manganese composite oxide is admixed with a lithium compound followed by calcination. Specific descriptions are given hereinbelow.

Raw material compounds of a composite oxide, for example, a Ni compound, a Mn compound, or a Co compound, are dissolved in a suitable solvent such as water so as to have a desired composition of an active substance material. Examples of the Ni compound, the Mn compound and the Co compound include sulfate, nitrate, carbonate, acetate, oxalate, oxide, hydroxide, and halide of the metal element. Specific examples of the Ni compound, the Mn compound and the Co compound include nickel sulfate, cobalt sulfate, manganese sulfate, nickel acetate, cobalt acetate, and manganese acetate, but not limited thereto.

During the process, if necessary, in order to have a further desired composition of an active substance, a compound containing at least one metal element such as Ti, Zr, Nb, W, P, Al, Mg, V, Ca, Sr or Cr as a metal element for replacing part of the layered lithium metal composite oxide which forms the active substance may be further incorporated.

A co-precipitation reaction can be performed by neutralization and precipitation reactions using the above raw material compounds and an alkali solution. Accordingly, metal composite hydroxide or metal composite carbonate containing the metal included in the above raw material compounds can be obtained. Examples of the alkali solution which can be used include an aqueous solution of sodium hydroxide, potassium hydroxide, sodium carbonate, or ammonia. For the neutralization reaction, it is preferable to use sodium hydroxide, sodium carbonate, or a mixture solution thereof. In addition, it is preferable to use an aqueous ammonia solution or ammonia salt for a complex reaction.

The addition amount of the alkali solution used for neutralization reaction is sufficient to have the equivalent ratio of 1.0 to components to be neutralized which are contained in the whole metal salts. However, for having pH control, it is preferably added together with an excess alkali amount.

The aqueous ammonia solution or ammonia salt used for a complex reaction is preferably added such that the ammonia concentration in the reaction solution is in a range of 0.01 to 2.00 mol/l. The pH of the reaction solution is preferably controlled in a range of 10.0 to 13.0. The reaction temperature is preferably 30° C. or higher, and more preferably 30 to 60° C.

The composite hydroxide obtained by co-precipitation reaction is then preferably filtered by suction, washed with water, and dried. Meanwhile, by controlling the conditions for performing the co-precipitation reaction (for example, stirring time and alkali concentration), particle diameter of the composite hydroxide can be controlled, and it has an influence on the average particle diameter of the secondary particles (D50(A)) of a positive electrode active substance which is finally obtained.

Subsequently, by mixing and calcining nickel-cobalt-manganese composite hydroxide with a lithium compound, the lithium-nickel-manganese-cobalt composite oxide can be obtained. Examples of the Li compound include lithium hydroxide or a hydrate thereof, lithium peroxide, lithium nitrate and lithium carbonate.

The calcination treatment can be performed by one step, but it is preferably performed by two steps (temporary calcination and main calcination). According to two-step calcination, a composite oxide can be obtained efficiently. The conditions for temporary calcination are not particularly limited, and they may vary depending on the lithium raw material, and thus cannot be unambiguously defined. Here, as the factors for controlling D1 (and also D2/D1) and crystallite diameter in particular, calcination temperature and calcination time for calcination (temporary calcination and main calcination in the case of a two-step calcination) are particularly important. By making a control of them based on the tendency described below, D1 (and also D2/D1) and the crystallite diameter can be controlled. Namely, D1 and crystallite particle diameter are increased by having longer calcination time. D1 and crystallite particle diameter are also increased by increasing the calcination temperature. Meanwhile, the temperature increase rate is preferably 1 to 20° C./minute from room temperature. Furthermore, the atmosphere is preferably either air or oxygen atmosphere. Here, when the NMC composite oxide is synthesized by using lithium carbonate as the Li raw material, temperature for temporary calcination is preferably 500 to 900° C., more preferably 600 to 800° C., and even more preferably 650 to 750° C. Furthermore, time for temporary calcination is preferably 0.5 to 10 hours and more preferably 4 to 6 hours. Meanwhile, as for the conditions for main calcination, the temperature increase rate is preferably 1 to 20° C./minute from room temperature, although it is not particularly limited thereto. Furthermore, the atmosphere is preferably either air or oxygen atmosphere. Here, when the NMC composite oxide is synthesized by using lithium carbonate as the Li raw material, temperature for calcination is preferably 800 to 1200° C., more preferably 850 to 1100° C., and even more preferably 900 to 1050° C. Furthermore, time for calcination is preferably 1 to 20 hours and more preferably 8 to 12 hours.

When a tiny amount of a metal element for replacing part of the layered lithium metal composite oxide forming an active substance material is added as needed, any means such as mixing it in advance with nickel, cobalt, manganate salt, adding it simultaneously with nickel, cobalt, manganate salt, adding it to a reaction solution during the reaction, or adding it to the nickel-cobalt-manganese composite oxide with a Li compound can be employed.

The lithium nickel-based composite oxide can be produced by suitably controlling the reaction conditions such as pH of a reaction solution, reaction temperature, reaction concentration, addition rate, and time for stirring.

Spinel Type Lithium Manganese Composite Oxide

The spinel type lithium manganese composite oxide typically has composition of $LiMn_2O_4$, and it is the composite oxide with spinel structure which essentially contains lithium and manganese. As for the specific constitution or production method, reference can be suitably made to disclosure of a related art such as JP 2000-77071 A.

The spinel type lithium manganese composite oxide also has a constitution that the secondary particles are formed by aggregation of primary particles. Furthermore, the average particle diameter of secondary particles (average secondary particle diameter) is preferably 5 to 50 μm, and more preferably 7 to 20 μm.

One characteristic of the positive electrode for a non-aqueous electrolyte secondary battery according to this embodiment is that the average secondary particle diameter of lithium nickel-based composite oxide (D50(A)) and the average secondary particle diameter of spinel type lithium manganese composite oxide (D50(B)), both being constituents of a positive electrode active substance contained in a positive electrode active substance layer, satisfy the following Mathematical Formula 1.

[Math. 3]

$$0.5 \leq D50(A)/D50(B) \leq 2.0 \qquad \text{Mathematical Formula 1:}$$

Meanwhile, the ratio value of D50(A)/D50(B) preferably satisfies the relationship of $0.67 \leq D50(A)/D50(B) \leq 1.5$.

Furthermore, other characteristic of the positive electrode for a non-aqueous electrolyte secondary battery according to this embodiment is that the content ratio of the lithium nickel-based composite oxide in the positive electrode active substance layer (A [% by weight]) and the content ratio of the spinel type lithium manganese composite oxide in the positive electrode active substance layer (B [% by weight]) satisfy following Mathematical Formula 2:

[Math. 4]

$$B/(A+B) \geq 0.2 \qquad \text{Mathematical Formula 2:}$$

Namely, the characteristic is that the ratio of spinel type lithium manganese composite oxide in the total amount of above two types is 20% by weight or more. Meanwhile, A and B preferably satisfy the relationship of $0.2 \leq B/(A+B) \leq 0.8$, and more preferably the relationship of $0.3 \leq B/(A+B) \leq 0.5$.

Figure 2:
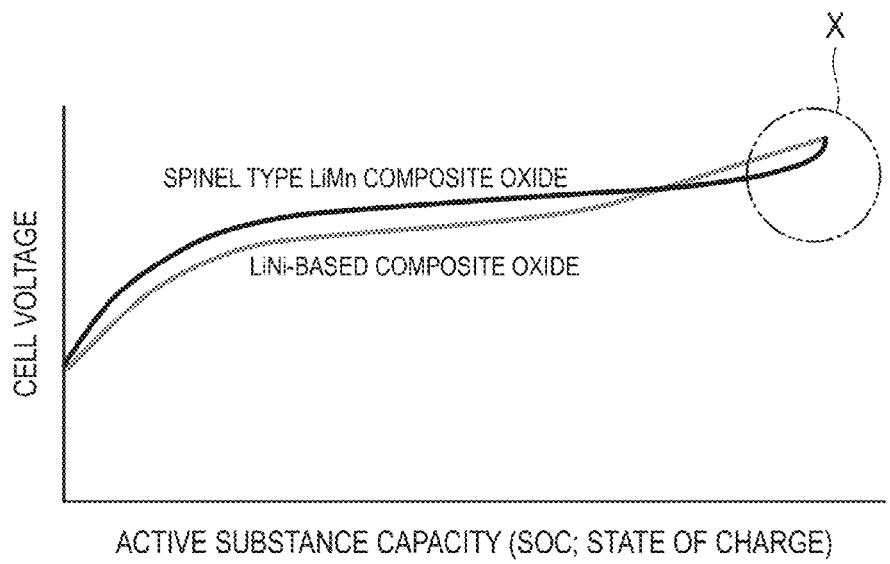
FIG. 2 is a graph illustrating a charge curve of a lithium nickel-based composite oxide such as an NMC composite oxide and a spinel type lithium manganese composite oxide.
Figure 3:
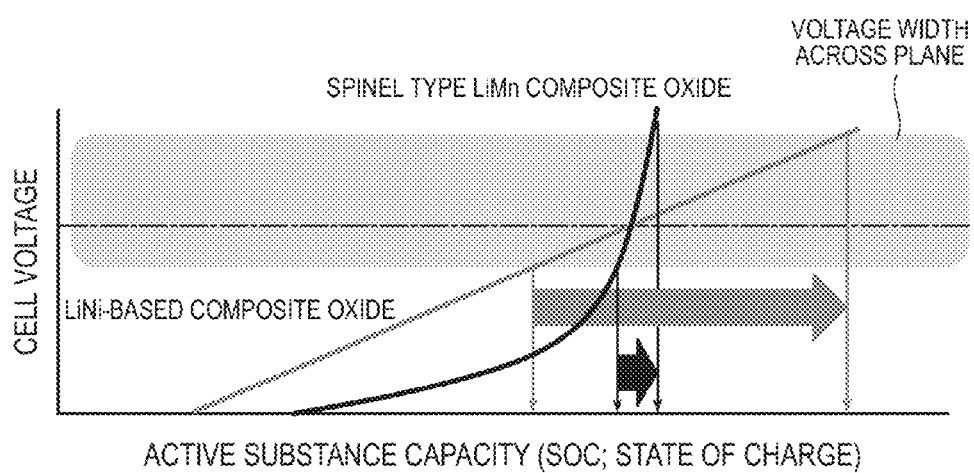
FIG. 3 is a graph illustrating the enlarged view of a region in terminal charge state as shown in the charge curve of FIG. 2 (region X in FIG. 2).

Since the positive electrode for a non-aqueous electrolyte secondary battery of this embodiment has the constitution described above, cycle characteristics can be improved as the electrode deterioration caused by non-uniformity of voltage across an electrode plane is suppressed when it is applied to a non-aqueous electrolyte secondary battery with high capacity and large area. The mechanism believed to be involved with exhibition of such excellent effects is described below in view of FIG. 2 and FIG. 3. FIG. 2 is a graph illustrating a charge curve of lithium nickel-based composite oxide such as an NMC composite oxide and a spinel type lithium manganese composite oxide. Furthermore, FIG. 3 is a graph illustrating the enlarged view of a region in terminal charge state as shown in the charge curve of FIG. 2 (region X in FIG. 2). Herein, the charge curve illustrated in FIG. 2 and FIG. 3 is expressed as a graph in which active substance capacity (SOC(State of Charge); charge state [%]) is described on the horizontal axis and cell voltage [V] is described on the vertical axis. Meanwhile, the charge curve illustrated in FIG. 2 and FIG. 3 is plotted by performing charge of a battery in constant-current mode up to predetermined cut off voltage (for example, 4.25 V in terms of cell voltage).

As illustrated in FIG. 2 and FIG. 3, the lithium nickel-based composite oxide and spinel type lithium manganese composite oxide generally exhibit a different behavior in a terminal charge state in charge curve. Specifically, a lithium nickel-based composite oxide exhibits a charge curve in which the active substance capacity increases and SOC appears to continuously increase (almost linearly) according to progress of charge (increased cell voltage) even in a terminal charge state. On the other hand, a spinel type lithium manganese composite oxide exhibits, starting from some point in the terminal charge state, a charge curve in which the increase rate of the active substance capacity appears to diminish compared to the progress of charge (increased cell voltage). Since such behavior exhibited by the spinel type lithium manganese composite oxide is referred to as "over-voltage", the spinel type lithium manganese composite oxide is designated as an "over-voltage promoter" in the present specification.

As described above, according to the studies by the inventors of the present invention, it was found that, even with the technique described in JP 2000-77071 A, if a battery is produced to have high capacity and large area, sufficient charge and discharge cycle characteristics are not achieved. As a result of investigation of the reasons for that, it was also found by the inventors of the present invention that non-uniformity of voltage occurs across an electrode plane as the battery is prepared to have high capacity and large area, although it has not occurred in a battery such as an everyday household battery which has low capacity and small area. Accordingly, it was speculated that, if a lithium nickel-based composite oxide, which causes an active substance capacity increase according to progress of charge (increased cell voltage) even in a terminal charge state, is contained in a positive electrode active substance, due to the non-uniformity of voltage across an electrode plane (voltage width across plane), a deviation in charge state occurs among the lithium nickel-based composite oxides of the same type as illustrated in FIG. 3. It was then hypothesized that local over-charge mode is established in the lithium nickel-based composite oxide with more progressed charge state, and as a result of deterioration of that composite oxide first, a decrease in charge and discharge cycle characteristics is caused. It was also hypothesized that, as Joule heat generated according to charge is not easily dissipated to an outside for a battery with high capacity and large area, inside of an electrode is full of heat, causing more non-uniformity of voltage across an electrode plane.

It was also speculated the occurrence of an over-charge mode of lithium nickel-based composite oxide described above could be suppressed if a spinel type lithium manganese composite oxide capable of functioning as an over-voltage promoter is used, as a positive electrode active substance, in combination with a lithium nickel-based composite oxide. Thus, further investigations were carried out. As a result, it was found that, when a spinel type lithium manganese composite oxide as an over-voltage promoter is contained at the content ratio of the aforementioned predetermined amount or higher in a positive electrode active substance after adjusting the ratio of the average secondary particle diameter of each composite oxide to a value within a predetermined range, a decrease in charge and discharge cycle characteristics is suppressed. Furthermore, with the battery of this embodiment, alleviation of the non-uniformity of voltage across an electrode plane is confirmed, and thus the legitimacy of the aforementioned hypothesis was shown with evidence and the present invention was completed accordingly.

Other Components

If necessary, the positive electrode active substance layer further contains, in addition to the aforementioned positive electrode active substance, other additives such as a conductive aid, a binder, an electrolyte (for example, polymer matrix, ion conductive polymer, and electrolyte solution), and lithium salt for enhancing ion conductivity. However, the content of a material capable of functioning as an active substance in the positive electrode active substance layer and the negative electrode active substance layer described below is preferably 85 to 99.5% by weight.

(Binder)

A binder used for the positive electrode active substance layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based rubber (VDF-PFMVE-TFE-based fluorine rubber), and vinylidene fluoride-chlorotrifluoroethylene fluorine-based rubber (VDF-CTFE-based fluorine rubber), an epoxy resin, and the like. These binders may be each used singly, or two or more thereof may be used in combination.

The amount of the binder contained in the positive electrode active substance layer is not particularly limited as long as the binder can bind the active substance. The amount of binder is preferably 0.5 to 15% by weight, more preferably 1 to 10% by weight with respect to the active substance layer.

If necessary, the positive electrode active substance layer further contains other additives such as a conductive aid, an electrolyte (for example, polymer matrix, ion conductive polymer, and electrolyte solution), and lithium salt for enhancing ion conductivity.

The conductive aid means an additive which is blended in order to enhance the conductivity of the positive electrode active substance layer or negative electrode active substance layer. Examples of the conductive aid include carbon materials such as carbon black including ketjen black and acetylene black; graphite; and carbon fiber. When the active substance layer contains a conductive aid, an electron network in the inside of the active substance layer is formed effectively, and it can contribute to improvement of the output characteristics of a battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include polyethylene oxide (PEO)-based and polypropylene oxide (PPO)-based polymer.

A blending ratio of the components that are contained in the positive electrode active substance layer and negative electrode active substance layer described below is not particularly limited. The blending ratio can be adjusted by suitably referring to the already-known knowledge about a lithium ion secondary battery. The thickness of each active substance layer is not particularly limited either, and reference can be made to the already-known knowledge about a battery. For example, the thickness of each active substance layer is about 2 to 100 µm.

[Negative Electrode Active Substance Layer]

The negative electrode active substance layer contains an active substance, and if necessary, further contains other additives such as a conductive aid, a binder, an electrolyte (for example, polymer matrix, ion conductive polymer, and electrolyte solution), and lithium salt for enhancing ion conductivity. The other additives such as a conductive aid, a binder, an electrolyte (for example, polymer matrix, ion conductive polymer, and electrolyte solution), and lithium salt for enhancing ion conductivity are the same as those described above for the positive electrode active substance layer.

Examples of the negative electrode active substance include a carbon material such as graphite, soft carbon, and hard carbon, a lithium-transition metal composite oxide (for example, $Li_4Ti_5O_{12}$), a metal material, and a lithium alloy-based negative electrode material. If necessary, two or more kinds of a negative electrode active substance may be used in combination. Preferably, from the viewpoint of capacity and output characteristics, a carbon material or a lithium-transition metal composite oxide is used as a negative electrode active substance. Meanwhile, it is needless to say that a negative electrode active substance other than those described above can be also used.

The average particle diameter of a negative electrode active substance is, although not particularly limited, preferably 1 to 100 µm, and more preferably 1 to 20 µm from the viewpoint of having high output.

The negative electrode active substance layer preferably contains at least an aqueous binder. The aqueous binder has a high binding property. Further, since water as a raw material is easily available and also only water vapor is generated during drying, there is an advantage that the investment on facilities of a production line can be greatly reduced and an environmental load can be reduced.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or an emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, styrene-vinyl acetic acid copolymer, styrene-acryl copolymer or the like), acrylonitrile-butadiene rubber, methacrylic acid methyl-butadiene rubber, (meth)acrylic polymer (polyethylacrylate, polyethylmethacrylate, polypropylacrylate, polymethylmethacrylate (methacrylic acid methyl rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (average polymerization degree is preferably 200 to 4000, and more preferably 1000 to 3000, and saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), Ito 50% by mol partially acetalized product of polyvinyl alcohol, or the like), starch and a modified product (oxidized starch, phosphoric acid esterified starch, cationized starch, or the like), cellulose derivatives (carboxymethyl cellulose, methyl cellulose, hydroxypropyl cellulose, hydroxyethyl cellulose, and a salt thereof), polyvinylpyrrolidone, polyacrylic acid (salt), polyethylene gylcol, a copolymer of (meth)acrylamide and/or (meth)acrylic acid salt [(meth)acrylamide polymer, (meth)acrylamide-(meth) acrylic acid salt copolymer, alkyl (meth) acrylic acid (carbon atom number of 1 to 4) ester-(meth) acrylic acid salt copolymer, or the like], a styrene-maleic acid salt copolymer, a mannich modified product of polyacrylamide, a formalin condensation type resin (urea-formalin resin, melamin-formalin resin or the like), a polyamidepolyamine or dialkylamine-epichlorohydrin copolymer, polyethyleneimine, casein, soybean protein, synthetic protein, and a water soluble polymer such as galactomannan derivatives. The aqueous binder can be used either singly or in combination of two or more types.

From the viewpoint of a binding property, the aqueous binder preferably contains at least one rubber-based binder selected from a group consisting of styrene-butadiene rubber, acrylonitrile-butadiene rubber, methacrylic acid methylbutadiene rubber, and methacrylic acid methyl rubber. Further, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and a salt thereof), polyvinylpyrrolidone, polyacrylic acid (salt), and polyethylene glycol. Among them, styrene-butadiene rubber and carboxymethyl cellulose (salt) are preferably combined as a binder. The weight content ratio between styrene-butadiene rubber and a water soluble polymer is, although not particularly limited, preferably as follows: styrene-butadiene rubber:water soluble polymer=1:0.1 to 10, and more preferably 1:0.5 to 2.

In a binder used for the negative electrode active substance layer, the content of the aqueous binder is preferably 80 to 100% by weight, preferably 90 to 100% by weight, and preferably 100% by weight.

[Separator (Electrolyte Layer)]

A separator has a function of maintaining an electrolyte to ensure lithium ion conductivity between a positive electrode and a negative electrode and also a function of a partition wall between a positive electrode and a negative electrode.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), a fuel cell vehicle (FCV) or the like, it is preferably 4 to 60 µm as a monolayer or a multilayer. Fine pore diameter of the microporous (microporous membrane) separator is preferably 1 µm or less at most (in general, the pore diameter is about several tens of nanometers).

As a non-woven separator, conventionally known ones such as cotton, rayon, acetate, nylon, polyester; polyolefin such as PP and PE; polyimide and aramid are used either singly or as a mixture. Furthermore, the volume density of a non-woven fabric is not particularly limited as long as sufficient battery characteristics are obtained with an impregnated polymer gel electrolyte. Furthermore, it is sufficient that the thickness of the non-woven separator is the same as that of an electrolyte layer. Preferably, it is 5 to 200 µm. Particularly preferably, it is 10 to 100 µm.

As described above, the separator also contains an electrolyte. The electrolyte is not particularly limited if it can exhibit those functions, and a liquid electrolyte or a gel polymer electrolyte is used. By using a gel polymer electrolyte, a distance between electrodes is stabilized and an occurrence of polarization is suppressed so that the durability (cycle characteristics) is improved.

The liquid electrolyte has an activity of a lithium ion carrier. The liquid electrolyte constituting an electrolyte solution layer has the form in which lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate. Furthermore, as a lithium salt, the compound which can be added to an active substance layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between layers is blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA) and a copolymer thereof.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

Furthermore, as a separator, a separator with a heat resistant insulating layer laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, melting point or heat softening point of 150° C. or higher, preferably 200° C. or higher, are used. By having a heat resistant insulating layer, internal stress in a separator which increases under temperature increase is alleviated so that the effect of inhibiting thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating a battery.

The inorganic particles in a heat resistant insulating layer contribute to the mechanical strength or the effect of inhibiting thermal shrinkage of a heat resistant insulating layer. The material used as inorganic particles is not particularly limited. Examples thereof include oxides ($SiO_2$, $Al_2O_3$, $ZrO_2$, $TiC_2$), hydroxides and nitrides of silicon, aluminum, zirconium and titanium, and a composite thereof. The inorganic particles may be derived from mineral resources such as boehmite, zeolite, apatite, kaolin, mullite, spinel, olivine, and mica, or artificially synthesized. Furthermore, the inorganic particles may be used either singly or in combination of two or more types. From the viewpoint of the cost, it is preferable to use silica ($SiO_2$) or alumina ($Al_2O_3$) among them. It is more preferable to use alumina ($Al_2O_3$).

The weight per unit area of heat resistant particles is, although not particularly limited, preferably 5 to 15 $g/m^2$. When it is within this range, sufficient ion conductivity is obtained and heat resistant strength is maintained, and thus desirable.

The binder in a heat resistant insulating layer has a role of adhering inorganic particles or adhering inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used include a compound such as carboxymethyl cellulose (CMC), polyacrylronitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among them, carboxymethyl cellulose (CMC), methyl acrylate, or polyvinylidene fluoride (PVDF) is preferably used. Those compounds may be used either singly or in combination of two or more types.

The content of the binder in a heat resistant insulating layer is preferably 2 to 20% by weight relative to 100% by weight of the heat resistant insulating layer. When the binder content is 2% by weight or more, the peeling strength between the heat resistant insulating layer and a porous substrate layer can be increased and vibration resistance of a separator can be enhanced. Meanwhile, when the binder content is 20% by weight or less, a gap between inorganic particles is maintained at an appropriate level so that sufficient lithium ion conductivity can be ensured.

Regarding the thermal shrinkage rate of a separator having a heat resistant insulating layer, both MD and TD are 10% or less after maintaining for 1 hour at conditions of 150° C., 2 $gf/cm^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

[Positive Electrode Current Collecting Plate and Negative Electrode Current Collecting Plate]

The material for forming the current collecting plate (25, 27) is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 27 and the negative electrode current collecting plate 25.

[Positive Electrode Lead and Negative Electrode Lead]

Further, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led from an outer casing is preferably coated with a heat resistant and insulating thermally shrunken tube or the like so that it has no influence on a product (for example, an automobile component, in particular, an electronic device or the like) according to electric leak after contact with neighboring instruments or wirings.

[Battery Outer Casing Body]

As for the battery outer casing body 29, an envelope-shaped casing to cover a power generating element, in which a laminate film including aluminum is contained, can be used in addition to a known metal can casing. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled and thus the thickness of an electrolyte solution layer can be easily controlled to a desired value, an aluminate laminate is more preferred for an outer casing body.

[Cell Size]

Figure 4:
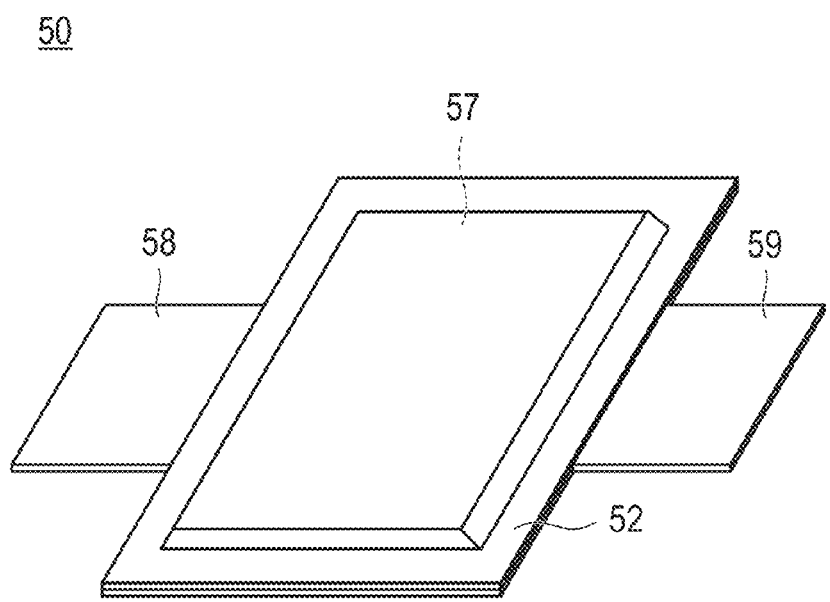
FIG. 4 is a perspective view illustrating outer appearance of a flat lithium ion secondary battery as a representative embodiment of a secondary battery.

FIG. 4 is a perspective view illustrating the appearance of a flat lithium ion secondary battery as a representative embodiment of a secondary battery. According to a preferred embodiment of the present invention, like this secondary battery, a flat stack type laminate battery having a constitution that the power generating element is enclosed in a battery outer casing body which is formed of a laminate film containing aluminum is provided.

As illustrated in FIG. 4, the flat lithium ion secondary battery 50 has a flat and rectangular shape, and from both sides, the positive electrode tab 58 and the negative electrode tab 59 are drawn to extract electric power. The power generating element 57 is covered by the battery outer casing material 52 of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the lithium ion secondary battery 10 illustrated in FIG. 1 as described above. In the power generating element 57, plural single battery layers (single cell) 19, which are each formed of the positive electrode (positive electrode active substance layer) 15, the electrolyte layer 17 and the negative electrode (negative electrode active substance layer) 13, are laminated.

Meanwhile, the lithium ion secondary battery is not limited to a flat shape of laminate type. The winding type lithium ion secondary battery may have a barrel shape or a flat and rectangular shape obtained by modifying the barrel shape, and it is not particularly limited. As an outer casing material of the barrel shape, a laminate film can be used, and a barrel can (metal can) of a related art can be used, and thus it is not particularly limited. Preferably, the power generating element is encased with an aluminum laminate film. Weight reduction can be achieved with such shape.

Furthermore, drawing of the tabs 58 and 59 illustrated in FIG. 4 is not particularly limited, either. The positive electrode tab 58 and the negative electrode tab 59 may be drawn from the same side or each of the positive electrode tab 58 and negative electrode tab 59 may be divided into plural tabs and drawn from each side, and thus it is not limited to the embodiment illustrated in FIG. 4. Furthermore, in a winding type lithium ion battery, it is also possible to form a terminal by using, for example, a barrel can (metal can) instead of a tab.

A typical electric vehicle has a battery storage space of about 170 L. Since a cell and an auxiliary machine such as a device for controlling charge and discharge are stored in this space, storage space efficiency of a cell is about 50% in general. The cell loading efficiency for this space is a factor of determining the cruising distance of an electric vehicle. As the size of a single cell decreases, the loading efficiency is lowered, and thus it becomes impossible to maintain the cruising distance.

Thus, in the present invention, the battery structure of which power generating element is covered with an outer casing body preferably has a large size. Specifically, length of short side of a laminate cell battery is preferably 100 mm or more. Such large-size battery can be used for an automobile. Herein, the length of short side of a laminate cell battery indicates the length of a shortest side. The upper limit of a length of a short side is, although not particularly limited, generally 400 mm or less.

[Volume Energy Density and Rated Discharge Capacity]

According to the market requirement, a typical electric vehicle needs to have driving distance (cruising distance) of 100 km or more per single charge. Considering such cruising distance, the volume energy density of a battery is preferably 157 Wh/L or more and the rated capacity is preferably 20 Wh or more.

Herein, with regard to the non-aqueous electrolyte secondary battery in which the positive electrode of this embodiment is used, largeness of a battery is determined in view of a relationship between battery area or battery capacity, from the viewpoint of a large-sized battery, which is different from a physical size of an electrode. Specifically, the non-aqueous electrolyte secondary battery of this embodiment is a flat stack type laminate battery, in which the ratio value of a battery area (projected area of a battery including a battery outer casing body) to rated capacity is 5 $cm^2$/Ah or more, and the rated capacity is 3 Ah or more. Only if a battery is prepared to have such high capacity and large area, a decrease in cycle characteristics is shown as caused by an occurrence of a local over-charge mode resulting from the aforementioned deviation in voltage across an electrode plane. On the other hand, in a battery such as an everyday household battery which does not have high capacity and large area, the deviation in voltage across an electrode plane is not shown, and thus no decrease in cycle characteristics resulting from an occurrence of a local over-charge mode is shown (see, Comparative Example 5 which is described below).

Furthermore, the aspect ratio of a rectangular electrode is preferably 1 to 3, and more preferably 1 to 2. Meanwhile, the aspect ratio of an electrode is defined by longitudinal/transversal ratio of a positive electrode active substance layer with a rectangular shape. By having the aspect ratio in this range, an advantage of having both the performances required for a vehicle and loading space can be obtained.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source or an auxiliary power source for operating a vehicle requiring high volume energy density and high volume output density, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

The non-aqueous electrolyte secondary battery of the present invention can maintain discharge capacity even when it is used for a long period of time, and thus has good cycle characteristics. It also has high volume energy density. For use in a vehicle such as an electric vehicle, a hybrid electric vehicle, a fuel cell vehicle, or a hybrid fuel cell vehicle, long service life is required as well as high capacity and large size compared to use for an electric and mobile electronic device. As such, the non-aqueous electrolyte secondary battery can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptible power source device.

EXAMPLES

The present invention is described in more detail in view of Examples and Comparative Examples. However, it is evident that the technical scope of the present invention is not limited to the Examples given below.

(1) Preparation of Lithium Nickel-Based Composite Oxide

To an aqueous solution (1 mol/L) having nickel sulfate, cobalt sulfate, and manganese sulfate dissolved therein, sodium hydroxide and ammonia were continuously supplied at 60° C. to adjust the pH to 11.3, and according to a co-precipitation method, metal composite hydroxide in which nickel, manganese, and cobalt were dissolved at molar ratio of 50:30:20 was produced.

The metal composite hydroxide and lithium carbonate were weighed such that the ratio of the total mole number of metals (Ni, Co and Mn) other than Li to the mole number of Li was 1:1, and then thoroughly mixed. The temperature was increased at temperature increase rate of 5° C./min, temporary calcination was performed at 900° C. for 2 hours in air atmosphere, the temperature was increased at temperature increase rate of 3° C./min, and then main calcination was performed at 920° C. for 10 hours. After cooling to room temperature, an NMC composite oxide ($LiNi_{0.50}Mn_{0.30}Co_{0.20}O_2$) was obtained as a positive electrode active substance. Meanwhile, the average secondary particle diameter (D50(A)) of the obtained NMC composite oxide was 10 μm.

(2) Preparation of Spinel Type Lithium Manganese Composite Oxide

As other positive electrode active substance, a spinel type lithium manganese composite oxide ($LiMn_2O_4$) was prepared. Herein, three types with different average secondary particle diameter (D50(B)) were prepared as described below.

$D50(B)=10$ μm, $D50(A)/D50(B)=1$    $LiMn_2O_4(1)$:

$D50(B)=15$ μm, $D50(A)/D50(B)=0.66$    $LiMn_2O_4(2)$:

$D50(B)=5$ μm, $D50(A)/D50(B)=2$    $LiMn_2O_4(3)$:

(3) Production of Positive Electrode

90% by weight in total of any one of the NMC composite oxide which has been prepared in above (1) and the spinel type lithium manganese composite oxide which has been prepared in above (2), 5% by weight of carbon black as a conductive aid (Super-P, manufactured by 3M Company), 5% by weight of polyvinylidene fluoride (PVDF) as a binder (#7200, manufactured by KUREHA CORPORATION), and a suitable amount of N-methyl-2-pyrrolidone (NMP) as a solvent for controlling slurry viscosity were admixed with one another to prepare a slurry of positive electrode active substance. Then, the obtained slurry of positive electrode active substance was coated on a surface of an aluminum foil (thickness: 20 μm) as a current collector, dried for 3 minutes at 120° C., subjected to press molding using a roll press machine to produce a positive electrode active substance layer of which planar shape is a rectangular shape. The positive electrode active substance layer was also formed on the back surface in the same manner as above. Accordingly, a positive electrode obtained by forming a positive electrode active substance layer on both surfaces of a positive electrode current collector (aluminum foil) was produced. Meanwhile, the coating amount on a single surface of positive electrode active substance layer was 14 mg/cm² (excluding the foil). According to this procedure, 16 kinds of positive electrodes with different composition of a positive electrode active substance were produced as described in the following Table 1 (numbers are present in % by weight).

TABLE 1

| Positive electrode symbol | Positive electrode active substance ||||| Conductive aid | Binder |
|---|---|---|---|---|---|---|
| | NMC composite oxide | $LiMn_2O_4$ (1) | $LiMn_2O_4$ (2) | $LiMn_2O_4$ (3) | | |
| C1 | 90 | | | | 5 | 5 |
| C2 | 81 | 9 | | | 5 | 5 |
| C3 | 72 | 18 | | | 5 | 5 |
| C4 | 63 | 27 | | | 5 | 5 |
| C5 | 54 | 36 | | | 5 | 5 |
| C6 | 45 | 45 | | | 5 | 5 |
| C7 | 81 | | 9 | | 5 | 5 |
| C8 | 72 | | 18 | | 5 | 5 |
| C9 | 63 | | 27 | | 5 | 5 |
| C10 | 54 | | 36 | | 5 | 5 |
| C11 | 45 | | 45 | | 5 | 5 |
| C12 | 81 | | | 9 | 5 | 5 |
| C13 | 72 | | | 18 | 5 | 5 |
| C14 | 63 | | | 27 | 5 | 5 |
| C15 | 54 | | | 36 | 5 | 5 |
| C16 | 45 | | | 45 | 5 | 5 |

Meanwhile, the size of each positive electrode was any one of □1 to □3 which are described in the following Table 2. Herein, L1 and L2 described in Table 2 indicate the length of the vertical line and the length of the horizontal line, respectively, of the flat rectangular-shaped positive electrode active substance layer (with the proviso that, L1≤L2), and D indicates the area of the positive electrode active substance layer.

TABLE 2

| | L1/mm | L2/mm | D/cm² | Aspect ratio L1/L2 |
|---|---|---|---|---|
| □1 | 100 | 100 | 100 | 1.00 |
| □2 | 150 | 250 | 375 | 1.67 |
| □3 | 10 | 8000 | 800 | 80.00 |

(4) Production of Negative Electrode

Subsequently, 95% by weight of artificial graphite as a negative electrode active substance, 2% by weight of carbon black as a conductive aid (Super-P, manufactured by 3M Company), 1% by weight of ammonium salt of carboxy methyl cellulose as a binder, and 2% by weight of styrene-butadiene copolymer latex were dispersed in purified water to produce a slurry of negative electrode active substance. Then, this slurry of negative electrode active substance was coated on a copper foil (thickness: 10 μm) to be a negative electrode current collector, dried for 3 minutes at 120° C., subjected to press molding using a roll press machine to produce a negative electrode. The same treatment was performed for the back surface to form a negative electrode active substance layer so that a negative electrode having a negative electrode active substance layer formed on both surfaces of a negative electrode current collector (copper foil) was produced. Meanwhile, the coating amount on the negative electrode active substance layer was adjusted such that the A/C ratio relative to the opposite positive electrode is 1.20 during the production of a test cell described below (accordingly, the coating amount on a single surface of negative electrode active substance layer is 6.1 to 7.9 mg/cm² (excluding the foil)).

(5) Production of Test Cell

By alternately laminating, via the separator (thickness: 25 μm, Celgard #2500, manufactured by Polypore K.K.), a positive electrode prepared in above (3) and the negative electrode prepared in above (4) according to selection as shown in the following Table 3 and selection of the electrode area from □1 or □2 (three layers of positive electrode and four layers of negative electrode), a power generating element was produced. The obtained power generating element was disposed within a bag made of aluminum laminate sheet as an outer casing, and an electrolyte solution was added thereto. As an electrolyte solution, a solution in which 1.0M LiPF$_5$ was dissolved in a mixed solvent of ethylene carbonate (EC) and diethyl carbonate (DEC) (volume ratio of 3:7), in which 1% by mass of vinylene carbonate was added as an additive relative to 100% by weight of the solution, was used. Herein, the liquid injection amount of the electrolyte solution was set at an amount which is 1.40 times of the entire pore volume of the positive electrode active substance layer, negative electrode active substance layer, and separator (the pore volume was obtained by calculation). Subsequently, under vacuum conditions, the opening of an aluminum laminate sheet bag was sealed such that the tab for taking out current, which had been connected to both electrodes, was led to outside, and a test cell as a laminate type lithium ion secondary battery was completed. Accordingly, twenty kinds of test cells which have different kinds and size of a positive electrode were produced as shown in the following Table 3. Meanwhile, the rated capacity (Ah) and the ratio of battery area to the rated capacity (cm²/Ah) for the each obtained test cell are shown in the following Table 3.

In addition, the positive electrode prepared in above (3) and the negative electrode prepared in above (4) are selected as shown in the following Table 3 and, with the electrode area of □3, lamination via a separator was made as described above. After attaching a tab for taking out the current, it was wound, enclosed in a can as an outer casing, and sealed after injection of an electrolyte solution. Accordingly, two kinds of a test cell with different kinds of a positive electrode (wound type battery) were produced as shown in the following Table 3 (Comparative Examples 6 and 8). Meanwhile, the rated capacity (cell capacity) (Ah) and the ratio of battery area to the rated capacity (capacity area ratio) (cm²/Ah) for the each obtained test cell are shown in the following Table 3. As described herein, the rated capacity of a battery was obtained as described below.

<<Measurement of Rated Capacity>>

For measurement of rated capacity, a test cell was injected with an electrolyte solution, allowed to stand for 10 hours or so, and subjected to initial charge. After that, the measurement was carried out according to the following step 1 to 5 at temperature of 25° C., in the voltage range of 3.0 V to 4.15 V.

Step 1: After constant current charge at 0.2 C to reach 4.15 V, it was rested for 5 minutes.

Step 2: After Step 1, it was charged for 1.5 hours by constant voltage charge followed by resting for 5 minutes.

Step 3: After constant current discharge at 0.2 C to reach 3.0 V, it was discharged for 2 hours by constant voltage discharge followed by resting for 10 seconds.

Step 4: After constant current charge at 0.2 C to reach 4.1 V, it was charged for 2.5 hours by constant voltage charge followed by resting for 10 seconds.

Step 5: After constant current discharge at 0.2 C to reach 3.0 V, it was discharged for 2 hours by constant voltage discharge followed by resting for 10 seconds.

Rated capacity: The discharge capacity (CCCV discharge capacity) from the constant current discharge to constant voltage discharge of Step 5 is used as rated capacity.

(6) Evaluation of Characteristics of Test Cell

The test cell which has been produced in above (5) was allowed to stand for 24 hours, and once the open circuit voltage (OCV) is stabilized, charging was performed at a rate of 1 C up to the cut off voltage of 4.25 V. After resting for 1 hour, it was discharged to cut off voltage of 3.0 V.

Figure 5:
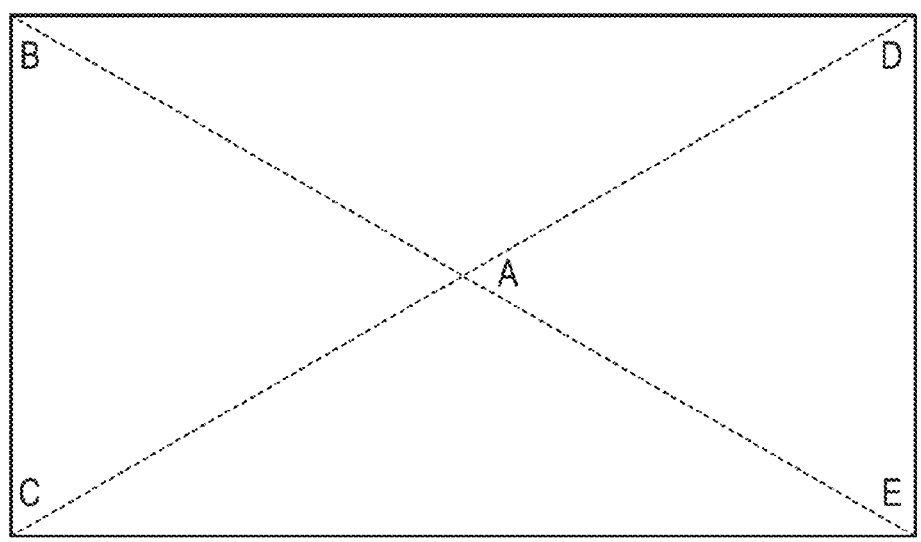
FIG. 5 is a drawing to describe potential measurement points when a test cell produced in Examples is charged and disintegrated, the potential (relative to metal lithium) is measured at 5 points on a positive electrode active substance layer, and a difference between the maximum potential and minimum potential is calculated as ΔV.

Meanwhile, the test cell was charged at constant current of 1 C. Then, it was disintegrated in an inert gas atmosphere, and five points including A, B, C and D at the end and the center part (see, FIG. 5) were punched to have ϕ10 mm. By using metal lithium as a counter electrode, the potential was measured. At that time, the difference between the maximum potential and the minimum potential among the five points is used as ΔV. The results are shown in the following Table 3. Meanwhile, smaller ΔV indicates better exhibition of the effect of the present invention as the over-voltage is promoted in a terminal stage of charging of the test cell and the non-uniformity of voltage across an electrode plane is alleviated.

Furthermore, as a durability test for mimicking the use in an automobile, charge and discharge cycle test at 1.5 C rate was performed in an incubator at 50° C., which mimics rapid charge, and the capacity retention rate after 300 cycles were calculated. The results are shown in the following Table 3.

TABLE 3

| Positive electrode | | Rated capacity (Ah) | Area capacity ratio (cm²/Ah) | ΔV (V) | Capacity retention rate (%) |
| --- | --- | --- | --- | --- | --- |
| Type | Electrode area | | | | |
| Comparative Example 1 | C1 | □2 | 4.7 | 81.6 | 0.35 | 70 |
| Comparative Example 2 | C2 | □2 | 4.5 | 85.5 | 0.26 | 72 |
| Example 1 | C3 | □2 | 4.3 | 89.8 | 0.13 | 77 |
| Example 2 | C4 | □2 | 4.1 | 94.6 | 0.13 | 77 |
| Example 3 | C5 | □2 | 3.9 | 99.9 | 0.11 | 78 |
| Example 4 | C6 | □2 | 3.6 | 105.8 | 0.11 | 78 |
| Comparative Example 3 | C7 | □2 | 4.5 | 85.5 | 0.27 | 72 |
| Example 5 | C8 | □2 | 4.3 | 89.8 | 0.12 | 77 |
| Example 6 | C9 | □2 | 4.1 | 94.6 | 0.12 | 77 |
| Example 7 | C10 | □2 | 3.9 | 99.9 | 0.11 | 78 |
| Example 8 | C11 | □2 | 3.6 | 105.8 | 0.1 | 78 |
| Comparative Example 4 | C12 | □2 | 4.5 | 85.5 | 0.29 | 72 |
| Example 9 | C13 | □2 | 4.3 | 89.8 | 0.14 | 77 |
| Example 10 | C14 | □2 | 4.1 | 94.6 | 0.12 | 78 |
| Example 11 | C15 | □2 | 3.9 | 99.9 | 0.12 | 78 |
| Example 12 | C16 | □2 | 3.6 | 105.8 | 0.11 | 78 |
| Comparative Example 5 | C1 | □1 | 1.3 | 37.4 | 0.23 | 79 |
| Comparative Example 6 | C1 | □3 | 3.4 | 3.6 | 0.26 | 76 |
| Comparative Example 7 | C3 | □1 | 1.1 | 96.2 | 0.11 | 79 |
| Comparative Example 8 | C3 | □3 | 3 | 3.9 | 0.11 | 77 |

As shown in the results of Table 3, it was found that, by having the constitution of the present invention, the test cell with high capacity and large area (□2) has small ΔV and therefore high capacity retention rate is achieved (cycle durability is improved). It was also found that, when the aspect ratio defined as a longitudinal/transversal ratio of a positive electrode active substance layer is in the range of 1 to 3, the effect of improving the cycle durability by having the constitution of the present invention is fully exhibited. Meanwhile, when □1 (battery area of 100 cm$^2$) is used, the effect of improving the cycle durability by having the constitution of the present invention is not shown because the rated capacity was small per se (it is not a test cell with high capacity and large area). Similarly, when □3 is used, the effect of improving the cycle durability by having the constitution of the present invention is extremely small because the area capacity ratio is low (compared to the effect of Comparative Example 8 relative to Comparative Example 6 in which □3 (aspect ratio of 80.00) is used (capacity retention rate 76%→77%), the effect of Example 1 relative to Comparative Example 1 in which □2 (aspect ratio of 1.67) is used (capacity retention rate 70%→77%) is more significant).

The present application is based on Japanese Patent Application No. 2013-054106 filed on Mar. 15, 2013, and its disclosure is entirely incorporated herein by reference.

REFERENCE SIGNS LIST 10, 50 Lithium ion secondary battery
11 Negative electrode current collector
12 Positive electrode current collector
13 Negative electrode active substance layer
15 Positive electrode active substance layer
17 Separator
19 Single battery layer
21, 57 Power generating element
25 Negative electrode current collecting plate
27 Positive electrode current collecting plate
29, 52 Battery outer casing material
58 Positive electrode tab
59 Negative electrode tab

The invention claimed is:

1. A positive electrode for a non-aqueous electrolyte secondary battery in which a ratio value of a battery area to a rated capacity is 89.8 cm$^2$/Ah or more, the battery area being a projected area of the non-aqueous electrolyte secondary battery including a battery outer casing body and the rated capacity being 3 Ah or more, the positive electrode comprising:
   a positive electrode current collector; and
   a positive electrode active substance layer that is formed on a surface of the positive electrode current collector and has a positive electrode active substance containing a lithium nickel-based composite oxide and a spinel type lithium manganese composite oxide,
   wherein, when an average secondary particle diameter of the lithium nickel-based composite oxide is D50(A), a content ratio of the lithium nickel-based composite oxide in the positive electrode active substance layer is A [% by mass], the average secondary particle diameter of the spinel type lithium manganese composite oxide is D50(B), and a content ratio of the spinel type lithium manganese composite oxide in the positive electrode active substance layer is B [% by mass], the positive electrode satisfies the following $0.5 \leq D50(A)/D50(B) \leq 2.0$ and $0.3 \leq B/(A+B) \leq 0.5$.

2. The positive electrode for a non-aqueous electrolyte secondary battery according to claim 1, wherein the lithium nickel-based composite oxide has a composition represented by a general formula: $Li_aNi_bMn_cCo_dM_xO_2$,
   wherein a, b, c, d, and x satisfy the following:

$0.9 \leq a \leq 1.2$, $0 \leq b \leq 1$, $0 \leq c \leq 0.5$, $0 \leq d \leq 0.5$, $0 \leq x \leq 0.3$, $b+c+d=1$, and wherein M represents at least one element selected from the group consisting of Ti, Zr, Nb, W, P, Al, Mg, V, Ca, Sr, and Cr.

3. The positive electrode for a non-aqueous electrolyte secondary battery according to claim 2, wherein b, c and d satisfy the following equations:

$0.44 \leq b \leq 0.51$, $0.27 \leq c \leq 0.31$, and $0.19 \leq d \leq 0.26$.

4. The positive electrode for a non-aqueous electrolyte secondary battery according to claim 1, wherein the positive electrode active substance layer has a rectangular shape and an aspect ratio of an electrode defined as a longitudinal/transversal ratio of a rectangular-shaped positive electrode active substance layer is 1 to 3.

5. A non-aqueous electrolyte secondary battery comprising:
   a power generating element including a positive electrode, a negative electrode obtained by forming a negative electrode active substance layer on a surface of a negative electrode current collector, and a separator, the positive electrode comprising:
   a positive electrode current collector; and
   a positive electrode active substance layer that is formed on a surface of the positive electrode current collector and has a positive electrode active substance containing a lithium nickel-based composite oxide and a spinel type lithium manganese composite oxide,
   wherein a ratio value of a battery area to a rated capacity is 89.8 cm$^2$/Ah or more, the battery area being a projected area of the non-aqueous electrolyte secondary battery including a battery outer casing body and the rated capacity being 3 Ah or more, and
   wherein, when an average secondary particle diameter of the lithium nickel-based composite oxide is D50(A), a content ratio of the lithium nickel-based composite oxide in the positive electrode active substance layer is A [% by mass], the average secondary particle diameter of the spinel type lithium manganese composite oxide is D50(B), and a content ratio of the spinel type lithium manganese composite oxide in the positive electrode active substance layer is B [% by mass], the positive electrode satisfies the following:

$0.5 \leq D50(A)/D50(B) \leq 2.0$, and $0.3 \leq B/(A+B) \leq 0.5$.

6. The non-aqueous electrolyte secondary battery according to claim 5, wherein the separator has a heat resistant insulating layer.

7. The non-aqueous electrolyte secondary battery according to claim 5, wherein the non-aqueous electrolyte secondary battery is a flat stack type laminate battery in which the power generating element is enclosed in the battery outer casing body which is formed of a laminate film containing aluminum.

8. The non-aqueous electrolyte secondary battery according to claim 5, wherein the rated capacity is 3 Ah or more.

9. The non-aqueous electrolyte secondary battery according to claim 5, wherein the lithium nickel-based composite oxide has a composition represented by a general formula:

$$Li_a Ni_b Mn_c Co_d M_x O_2,$$

wherein a, b, c, d, and x satisfy the following:

$0.9 \leq a \leq 1.2,$ $0 \leq b \leq 1,$ $0 \leq c \leq 0.5,$ $0 \leq d \leq 0.5,$ $0 \leq x \leq 0.3,$ $b+c+d=1,$ and wherein M represents at least one element selected from the group consisting of Ti, Zr, Nb, W, P, Al, Mg, V, Ca, Sr, and Cr.

10. The non-aqueous electrolyte secondary battery according to claim 5, wherein b, c and d satisfy the following:

$0.44 \leq b \leq 0.51,$ $0.27 \leq c \leq 0.31,$ and $0.19 \leq d \leq 0.26.$

11. The non-aqueous electrolyte secondary battery according to claim 5, wherein the positive electrode active substance layer has a rectangular shape and an aspect ratio of an electrode defined as a longitudinal/transversal ratio of a rectangular-shaped positive electrode active substance layer is 1 to 3.

* * * * *